United States Patent
Oudart et al.

(10) Patent No.: US 9,587,570 B2
(45) Date of Patent: Mar. 7, 2017

(54) SYSTEM AND METHOD FOR CONTROL OF A TRANSITION BETWEEN SI AND HCCI COMBUSTION MODES

(71) Applicant: Robert Bosch GmbH, Stuttgart (DE)

(72) Inventors: Joël Oudart, Sunnyvale, CA (US); Nikhil Ravi, Mountain View, CA (US); David Cook, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 472 days.

(21) Appl. No.: 14/185,357

(22) Filed: Feb. 20, 2014

(65) Prior Publication Data

US 2014/0230784 A1    Aug. 21, 2014

Related U.S. Application Data

(60) Provisional application No. 61/767,687, filed on Feb. 21, 2013.

(51) Int. Cl.
*F02P 5/00*    (2006.01)
*F02D 28/00*   (2006.01)
*F02D 13/02*   (2006.01)
*F02D 41/30*   (2006.01)
*F02D 41/00*   (2006.01)

(52) U.S. Cl.
CPC ......... *F02D 28/00* (2013.01); *F02D 13/0203* (2013.01); *F02D 13/0265* (2013.01); *F02D 13/0269* (2013.01); *F02D 41/3041* (2013.01); *F02D 41/3064* (2013.01); *F02D 41/3023* (2013.01); *F02D 41/3035* (2013.01); *F02D 2041/001* (2013.01); *Y02T 10/128* (2013.01); *Y02T 10/142* (2013.01)

(58) Field of Classification Search
CPC .. F02P 5/045; F02D 41/3035; F02D 41/3064; F02D 41/3041; F02D 41/401; F02D 2041/141
USPC ....... 123/90.15, 299, 300, 433, 406.26, 436; 701/103–105, 110
See application file for complete search history.

(56) References Cited

U.S. PATENT DOCUMENTS

| 7,213,566 B1 | 5/2007 | Jankovic |
| 2005/0183693 A1 | 8/2005 | Yang et al. |

(Continued)

OTHER PUBLICATIONS

International Search Report and Written Opinion corresponding to PCT Application No. PCT/US2014/017476, mailed Jun. 11, 2014 (11 pages).

*Primary Examiner* — John Kwon
(74) *Attorney, Agent, or Firm* — Maginot Moore & Beck LLP

(57) ABSTRACT

In one embodiment an engine system includes a cylinder, an inlet valve configured to control the flow of gases into the cylinder, an outlet valve configured to control the flow of gases out of the cylinder, a throttle configured to control the flow of fuel into the cylinder, a memory including program instructions stored therein, and a processor operably connected to the inlet valve, the outlet valve, the throttle, and the memory, and configured to execute the program instructions to control the inlet valve and the outlet valve in accordance with an HCCI valve lift profile and an SI valve open/close profile, and activate a first spark in the cylinder while controlling the inlet valve and the outlet valve in accordance with the HCCI valve lift profile and the SI valve open/close profile.

20 Claims, 7 Drawing Sheets

(56) References Cited

U.S. PATENT DOCUMENTS

| | | | |
|---|---|---|---|
| 2008/0035125 A1 | 2/2008 | Jankovic | |
| 2008/0271688 A1* | 11/2008 | Wermuth | F02B 1/06 123/90.16 |
| 2011/0283972 A1 | 11/2011 | Wermuth et al. | |
| 2014/0230786 A1* | 8/2014 | Ravi | F02D 41/3035 123/406.52 |

* cited by examiner

SYSTEM AND METHOD FOR CONTROL OF A TRANSITION BETWEEN SI AND HCCI COMBUSTION MODES

This application claims the benefit of U.S. Provisional Application No. 61/767,687 filed Feb. 21, 2013, the entirety of which is incorporated herein by reference.

TECHNICAL FIELD

This disclosure relates to a control system for transition between a spark ignited (SI) combustion and homogeneous charge compression ignition (HCCI) combustion on internal combustion engines (ICE).

BACKGROUND

Homogenous Charge Compression Ignition (HCCI) is an advanced combustion concept for piston engines that offers significant efficiency and emissions benefits over current technologies. The HCCI combustion process has been studied for over two decades, and has shown promise as a potential technology for automotive engines that can improve on the efficiency and emissions capabilities of current technologies.

In HCCI, a homogeneous mixture of air, fuel and hot exhaust gases is compressed until auto-ignition occurs. Consequently, combustion is not initiated by a spark. Rather, precise conditions are established within a cylinder such that simply by compressing the gases within the cylinder ignition is initiated. HCCI is thus highly dependent upon the in-cylinder temperature and composition of gases. In order to provide a desired temperature for HCCI ignition, a significant amount of hot exhaust gas from the previous combustion cycle is typically trapped within the cylinder to enable this auto-ignition; however, other methods for initiating HCCI have also been tested, including increasing the compression ratio and heating the intake air.

A significant benefit to incorporating HCCI is that HCCI engines can be run fully unthrottled, significantly reducing pumping losses that are typical in a spark-ignited (SI) engine, thereby boosting the efficiency. Additionally, due to the highly diluted reactant mixture and absence of a flame, peak combustion temperatures are much lower, which reduces NOx emissions significantly.

The provision of an HCCI only system is problematic, however, because of load limitations. Auto-ignition occurs with very high pressure rise rate leading to the phenomenon of ringing at higher loads which is structurally undesirable for the engine. Hence there is a cap on the maximum power output in HCCI. At the low load end, HCCI mode is harder to maintain because the temperature required to auto-ignite cannot be achieved. HCCI mode is also not possible at lower speeds as the chemical breakdown of species to initiate auto-ignition is at a very slow rate at lower speeds. This leads to unstable operation or misfire.

Therefore there exists only a limited operational region for running an engine efficiently and stably in HCCI mode. Accordingly, attempts have been made to incorporate HCCI mode in an automotive engine by combining it with the conventional SI mode. In these approaches, SI mode is used during cold startup periods and while ramping up the engine through low-speed and low loads. In the region of medium to medium-high loads, the engine can be operated in HCCI mode, maximizing efficiency and minimizing emissions. The mode can be switched back to SI when the power demand exceeds the upper-load limit of the HCCI mode.

Transitioning smoothly from one mode to another however, presents additional challenges. For example, maintaining a desired torque during mode switching can be challenging due to the significant differences between SI and HCCI operating conditions. Therefore, implementation of HCCI on a production engine requires advanced control algorithms. The control algorithms are complicated due to the lack of a direct ignition trigger (such as a spark), and the cycle-to-cycle dynamics introduced by the trapped exhaust gas in an HCCI mode. Several modeling and control approaches for steady-state and transient control of HCCI have been presented in the literature.

As is evident from the foregoing discussion, transitions between HCCI and traditional SI mode are necessary both at the low load/speed as well as the mid-high load/speed end of the operating range. This is shown schematically in FIG. 1. In FIG. 1, the region of engine loads/engine speeds wherein HCCI mode is advantageous is indicated by area 10. The area 12 identifies the allowable operating region of SI mode. Accordingly, as an engine transitions along a line 14 from a low speed/low load condition to a high speed high load condition, the engine will optimally transition from SI mode to HCCI mode at location 16 and transition from HCCI mode to SI mode again at location 18. Similarly, as an engine transitions along a line 20 from a high speed/high load condition to a low speed/low load condition, the engine will optimally transition from SI mode to HCCI mode at location 22 and transition from HCCI mode to SI mode again at location 24.

To accomplish the desired mode switching, HCCI engines are typically implemented either with a fully flexible variable valve actuation system, or with dual cam phasers. The former is suitable only for research purposes, and is not feasible to implement on a production setup. Dual cam phasers for HCCI engines are typically designed with two sets of valve profiles, one for SI mode and one for HCCI mode.

FIG. 2 shows a typical example of SI and HCCI valve lift and open/close profiles. Line 30 identifies the valve lift position of the exhaust valve versus crankshaft angle degree (CAD) in an SI mode and the line 32 identifies the valve lift position of the intake valve versus CAD in an SI mode. The line 34 identifies the valve lift position of the exhaust valve versus CAD in HCCI mode and the line 36 identifies the valve lift position of the intake valve versus CAD in HCCI mode. The maximum heights of the lines 30, 32, 34, and 36 are referred to herein as "valve lift profiles", while the CAD at which the lines depart and return to 0 mm is referred to as the valve "open/close" or "timing" profile.

FIG. 2 shows that in SI mode, it is desirable to have high valve lifts (lift profile), and long open valve durations (open/close profile), while in HCCI mode it is preferable to have low valve lifts and short open valve durations (to allow for trapping of exhaust gases). Consequently, a transition from SI to HCCI also involves a switch from the SI valve profiles (both lift and timing profiles) to the HCCI valve profiles, which can introduce significant dynamics.

Different approaches for switching between the two modes have been presented in the literature, including single-step switches as well as transitions that happen more gradually over several cycles. Some control approaches have also been presented in the literature—one article shows a control approach to switch from SI with early intake valve closing to HCCI, where fuel quantity and valve timings are controlled during the switch; another article presents an approach to control load and air fuel ratio during a multicycle transition from SI to HCCI. All these methods, however, result in undesired dynamics.

What is needed therefore is a control system which provides for transitions between SI and HCCI modes while exhibiting improved dynamics.

SUMMARY

In one embodiment an engine system includes a cylinder, an inlet valve configured to control the flow of gases into the cylinder, an outlet valve configured to control the flow of gases out of the cylinder, a throttle configured to control the flow of fuel into the cylinder, a memory including program instructions stored therein, and a processor operably connected to the inlet valve, the outlet valve, the throttle, and the memory, and configured to execute the program instructions to control the inlet valve and the outlet valve in accordance with a homogeneous charge compression ignition (HCCI) valve lift profile and a spark ignition (SI) valve open/close profile, and activate a first spark in the cylinder while controlling the inlet valve and the outlet valve in accordance with the HCCI valve lift profile and the SI valve open/close profile.

In another embodiment, a method of controlling an engine system with a cylinder, an inlet valve configured to control the flow of gases into the cylinder, and an outlet valve configured to control the flow of gases out of the cylinder, includes controlling the inlet valve and the outlet valve in accordance with a homogeneous charge compression ignition (HCCI) valve lift profile and a spark ignition (SI) valve open/close profile, and activating a first spark in the cylinder while controlling the inlet valve and the outlet valve in accordance with the HCCI valve lift profile and the SI valve open/close profile.

DETAILED DESCRIPTION

Figure 1:
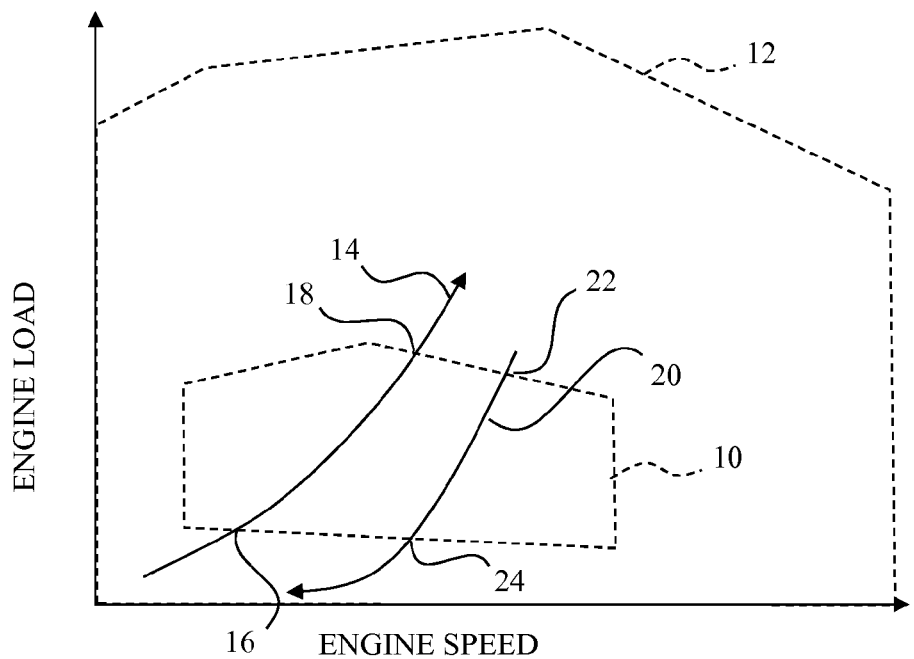
FIG. 1 depicts a schematic of SI and HCCI operating regimes and transitions between them.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art to which this disclosure pertains.

Figure 3:
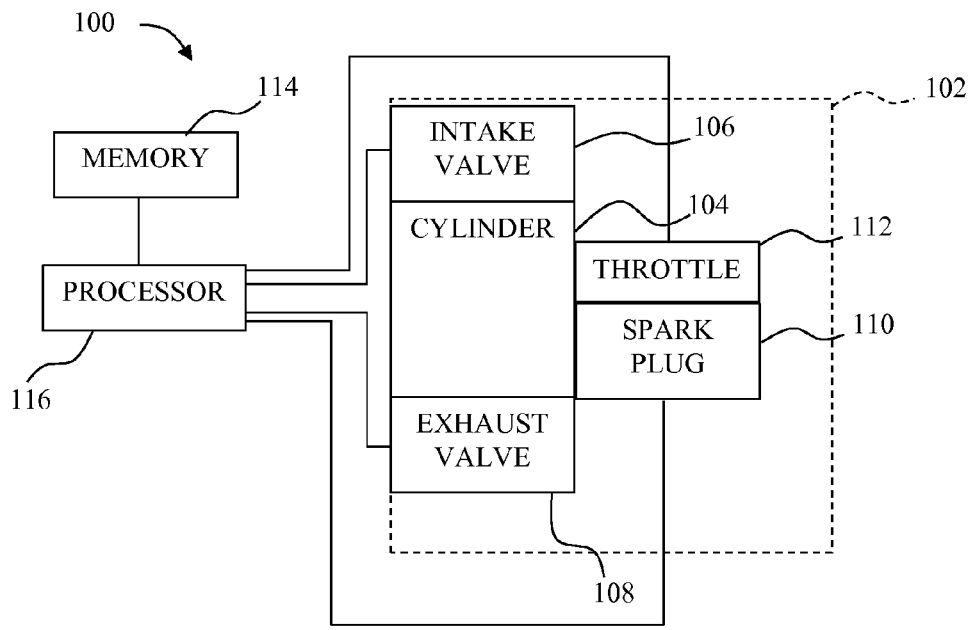
FIG. 3 depicts an engine system in accordance with principles of the disclosure.

FIG. 3 depicts an engine system 100 including an engine 102. The engine includes at least one cylinder 104. While only one cylinder 104 and associated components are shown, in some embodiments a plurality of cylinders 104 are incorporated. Associated with the cylinder 104 are an engine intake valve 106, an engine exhaust valve 108, and a spark plug 110. A throttle 112 controls flow of fuel into the cylinder 104.

The engine system 100 further includes a memory 114 and a processor 116. Various program instructions, discussed in further detail below, are programmed into the memory 114. The processor 116 is operable to execute the program instructions programmed into the memory 114. The processor 116 is operably connected to the engine intake valve 106, the engine exhaust valve 108, the spark plug 110, and the throttle 112. The processor 116 is also operably connected to other sensors and controllers, some of which are described in further detail below.

The processor 116 executes the program instructions stored within the memory 114 to provide a control strategy based on an approach that involves an SI mode of operation with the same low-lift valve profile as in HCCI—therefore the combustion mode switch dynamics are decoupled from the dynamics of switching valve profiles from the high-lift, long-duration profile typically used in SI to the low-lift, short-duration profile used for HCCI as described above with respect to FIG. 2.

Figure 4:
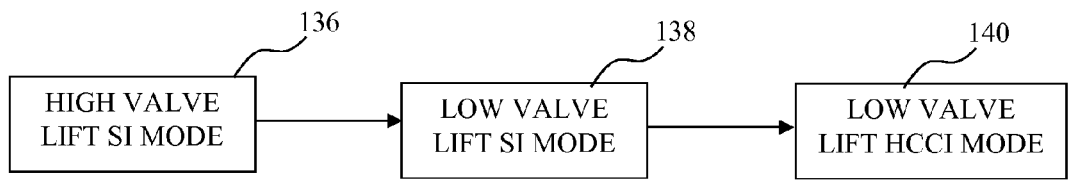
FIG. 4 depicts an SI to HCCI transition strategy controlled by the system of FIG. 3.

FIG. 4 depicts the general control process when proceeding along the line 14 of FIG. 1 the processor 116 initially controls the engine intake valve 106 and the engine exhaust valve 108 in a high valve lift SI mode 136. When a transition is required, the processor 116 controls the engine intake valve 106 and the engine exhaust valve 108 in a low valve lift SI mode 138. Once the conditions for HCCI are met, the processor 116 controls the engine intake valve 106 and the engine exhaust valve 108 in a low valve lift HCCI mode 140.

Figure 5:
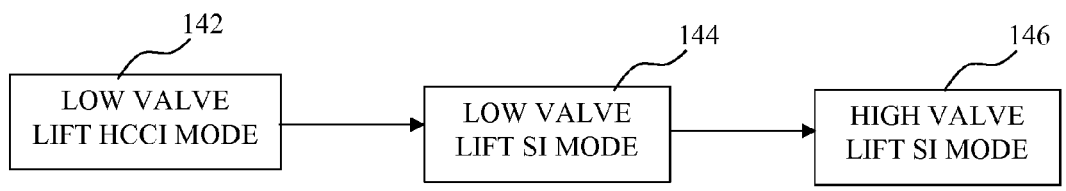
FIG. 5 depicts an HCCI to SI transition strategy controlled by the system of FIG. 3.

FIG. 5 depicts the general control process when proceeding along the line 20 of FIG. 1. The processor 116 initially controls the engine intake valve 106 and the engine exhaust valve 108 in a low valve lift HCCI mode 142. When a transition is required, the processor 116 controls the engine intake valve 106 and the engine exhaust valve 108 in a low valve lift SI mode 144. The processor 116 then controls the engine intake valve 106 and the engine exhaust valve 108 in a high valve lift SI mode 146.

In either the transition in FIG. 4 or the transition in FIG. 5, once the valve lift has been established, the throttle position and valve timing (open/shut) must still be modified. For purpose of explanation, transition from SI mode to HCCI mode is discussed in detail below; however, the same principles are applied to a transition from HCCI to SI mode.

Figure 2:
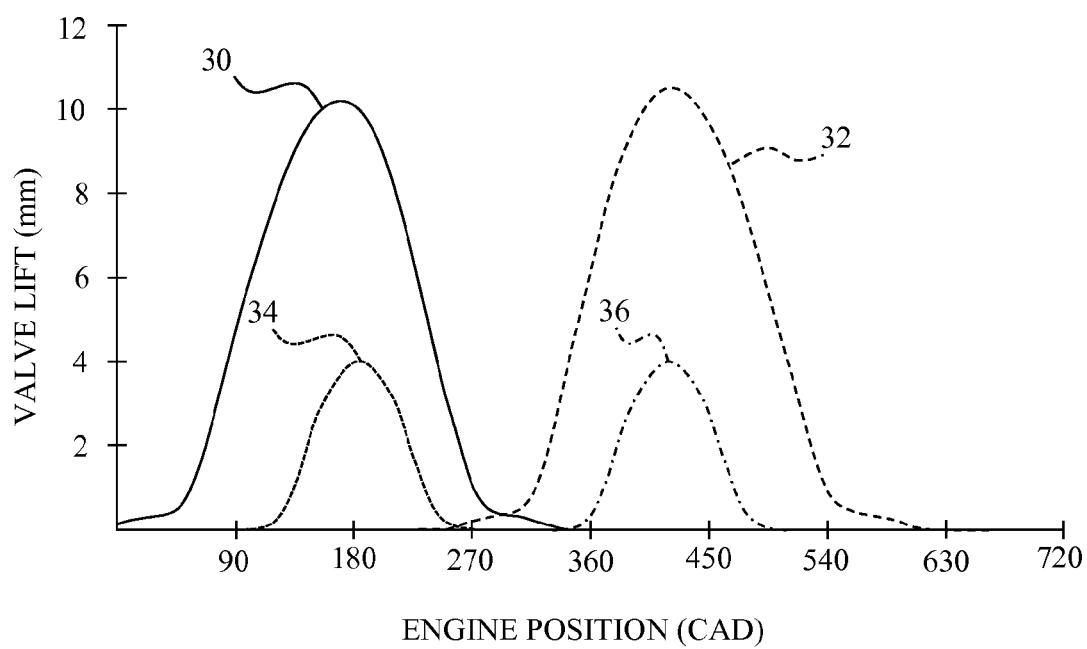
FIG. 2 depicts a chart of example valve profiles in SI and HCCI operational modes.

Accordingly, to transition from SI mode to HCCI mode, the throttle 112 must be moved from a throttled position to a fully open position, and the timing of the opening and closing of the valves 106/108 must also be modified between the SI mode and HCCI mode depicted in FIG. 2, while preventing undesired torque modulations.

Figure 6:
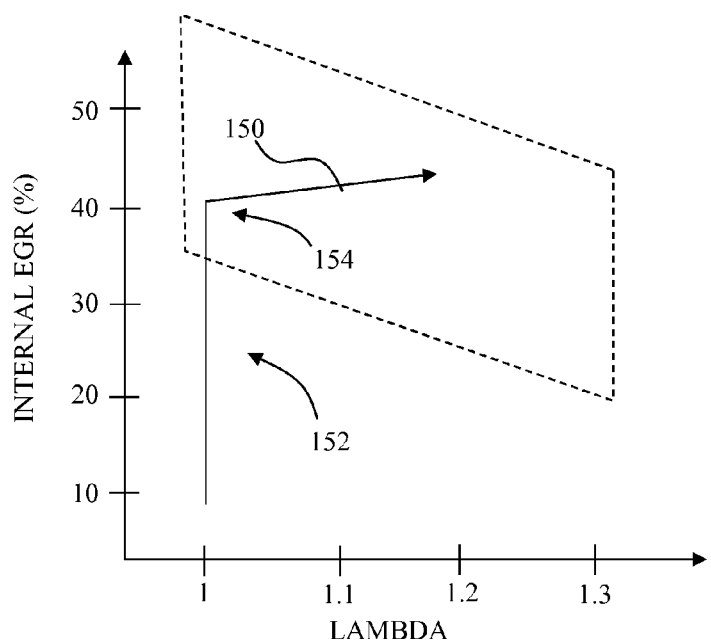
FIG. 6 depicts a chart showing a transition from SI to HCCI mode in terms of the internal exhaust gas residual (EGR) fraction and Lambda.

By executing program instructions stored in the memory 114, the processor 116 thus controls a transition which is shown schematically in FIG. 6. In FIG. 6, the processor 116 is initially controlling the engine 102 in an SI mode. As noted above, in SI mode, lambda, which represents the ratio of the actual air-fuel ratio to the stoichiometric air-fuel ratio, and the fraction of internal exhaust gas recirculation (EGR) or trapped exhaust mass, typically runs stoichiometric (lambda=1) and with low internal EGR. SI mode is usually controlled with the throttle partially closed (to maintain stoichiometry), particularly at low speeds, and with high-lift cams operating the intake and exhaust valves (to maximize flow).

HCCI mode, in contrast, is usually run lean (lambda>1) and with high internal EGR. HCCI mode is thus controlled with the throttle 112 fully open (thereby minimizing pumping losses) and with low-lift cams operating the valves 106/108 (to enable adequate trapping of residuals in the cylinder 104.

Figure 7:
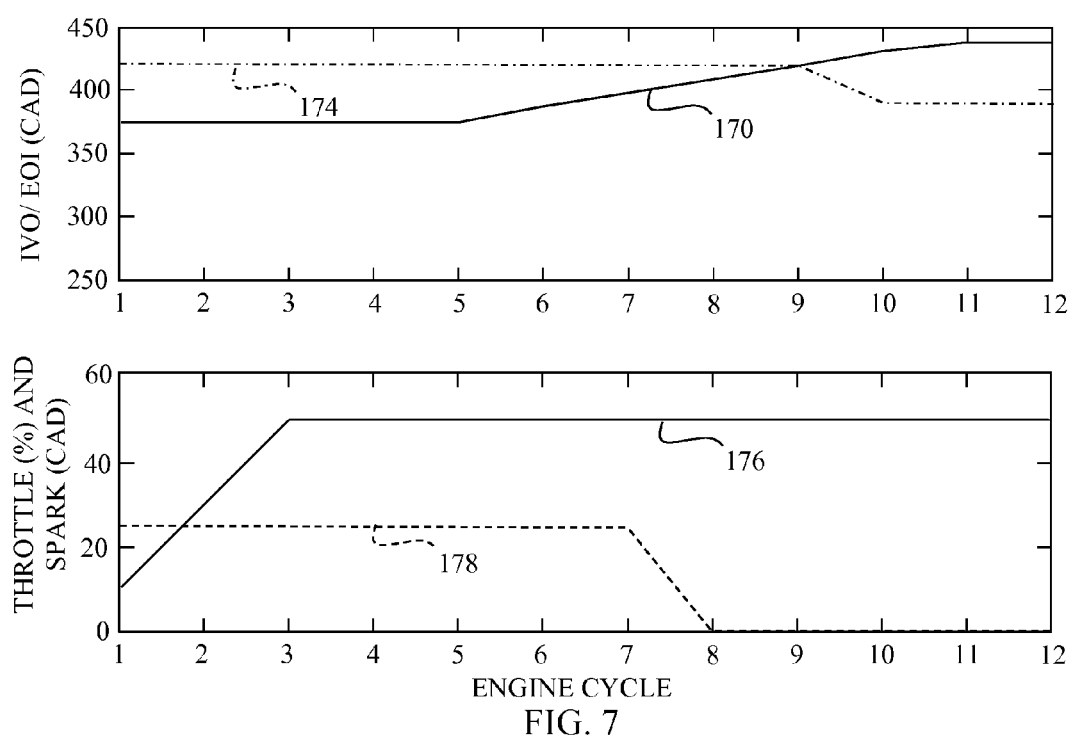
FIG. 7 depicts the intake valve opening time, end of ignition, and spark activation timing as a function of crankshaft angle degree (CAD), along with the throttle position during a transition from SI mode to HCCI mode.

For the transition from SI mode indicated by operating parameters line 150 in FIG. 6, the processor 116 controls the throttle 112 open while the open/close timing of the engine intake valve 106 and the engine exhaust valve 108 are ramped from the SI timing to the HCCI timing. Additionally, the combustion timing, which is controlled by activation of the spark plug 110 in SI mode, is delayed, thereby reducing efficiency. These processes are depicted in FIG. 7. In FIG. 7, the line 170 indicates the timing of the opening of the inlet valve 106, and the line 174 indicates the timing of the end of fuel injection (EOI). Additionally, the line 176 indicates the position of the throttle 112 and the line 178 indicates the timing of the activation of the spark plug 110.

Figure 8:
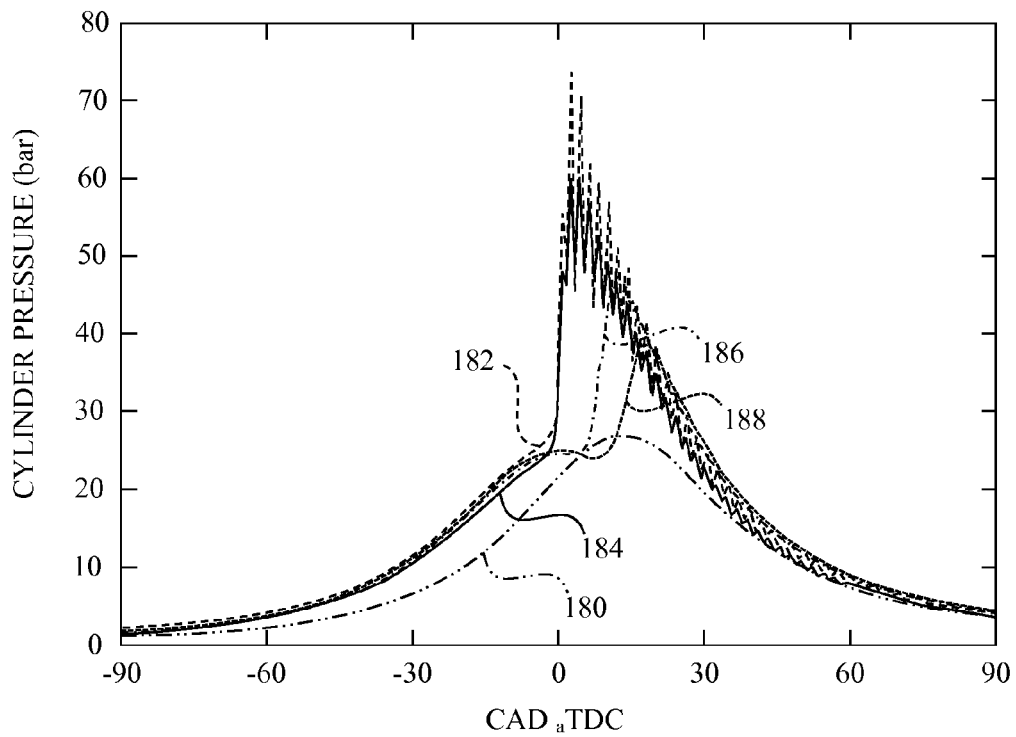
FIG. 8 depicts a plot of the cylinder pressure versus CAD with respect to top dead center (TDC) during SI mode operation and the first four cycles of HCCI operation when the end of ignition is controlled based upon a normal HCCI cycle.

The EOI in FIG. 7 (line 174) continues to be delayed after HCCI initiation (at cycle 7) until cycle 10. This delay is used to reduce ringing. By way of example, FIG. 8 depicts the pressure in the cylinder 104 without a delay in the injection timing of fuel. In FIG. 8, the line 180 represents pressure resulting from SI mode control, while the line 182 is the pressure for the first HCCI cycle, line 184 is the pressure for the second HCCI cycle, line 186 is the pressure for the third HCCI cycle, and line 188 is the pressure for the fourth HCCI cycle. FIG. 8 indicates that ringing would occur which would be noticeable to a driver. Ringing occurs since the last combustion cycle in SI mode produces residual exhaust gases with a relatively high temperature, and different residual compositions with higher NOx than steady state HCCI operation. Residual composition, through NOx, tends to increase the mixture reactivity.

Figure 9:
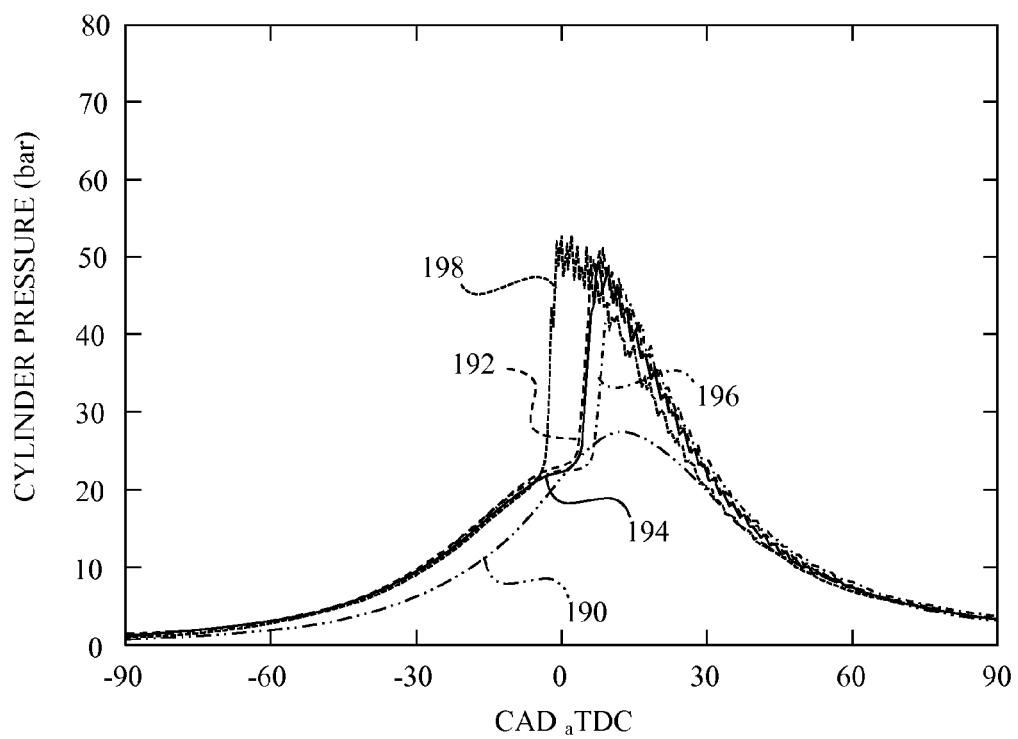
FIG. 9 depicts a plot of the cylinder pressure during SI mode operation and the first four cycles of HCCI operation when the end of ignition is controlled to be delayed compared to a normal HCCI cycle.

FIG. 9 depicts the pressure in the cylinder 104 with a delay in the injection timing of fuel. In FIG. 9, the line 190 represents pressure resulting from SI mode control, while the line 192 is the pressure for the first HCCI cycle, line 194 is the pressure for the second HCCI cycle, line 196 is the pressure for the third HCCI cycle, and line 198 is the pressure for the fourth HCCI cycle. Thus, by delaying EOI, the increased reactivity resulting from the conditions of the last SI cycle are countered. Thus, FIG. 9 indicates that ringing is substantially reduced by the delayed EOI in the first few cycles of HCCI operational mode.

Figure 10:
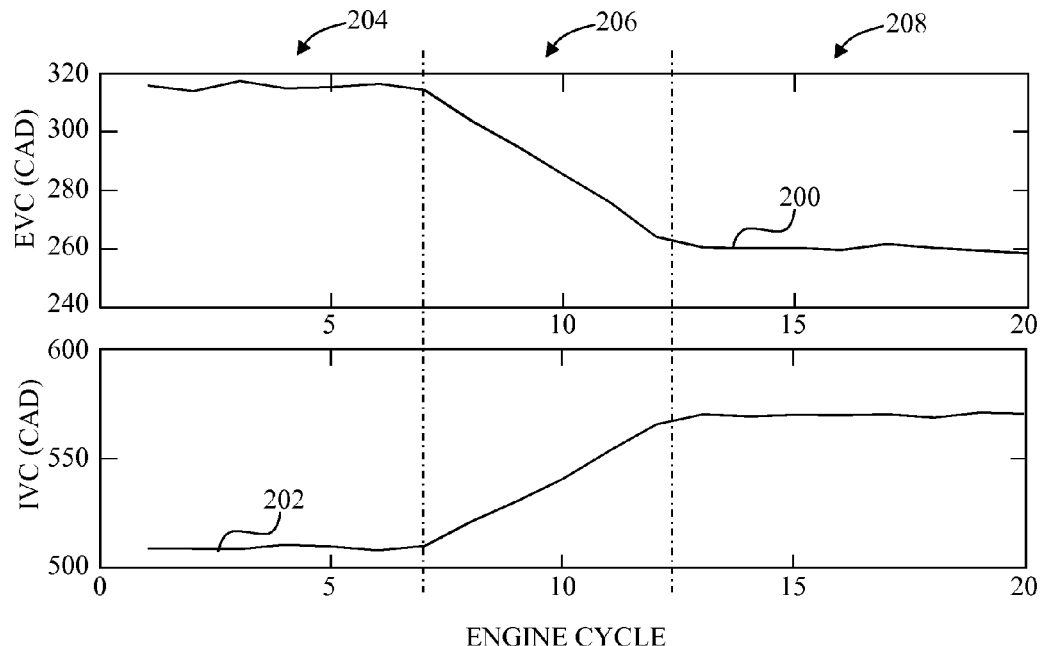
FIG. 10 depicts the exhaust and intake valve closing time as a function of CAD during the transition from SI mode to HCCI mode.

The timing of the closing of the valves 106/108 is depicted in FIG. 10. In FIG. 10, closing of the exhaust valve 108 (EVC) is depicted by line 200 while the timing of the closing of the inlet valve 106 (IVC) is depicted by line 202. In the region 204 (SI mode), the exhaust valve 108 is closed at about 318 CAD while the intake valve 106 is closed at about 510 CAD. In the transition region 206, the closing profile is ramped to the HCCI profile of region 208. The closing of the exhaust valve 108 thus changes from about 318 CAD to about 260 CAD while the closing of the inlet valve 106 changes from about 510 CAD to about 570 CAD.

The ramp time depicted in FIG. 10 is constrained by the particular system used on the engine. Thus, for systems incorporating a cam phaser the actuator dynamic is rather slow on a cycle by cycle base, compared to systems incorporating an actuator such as spark or injection.

Figure 11:
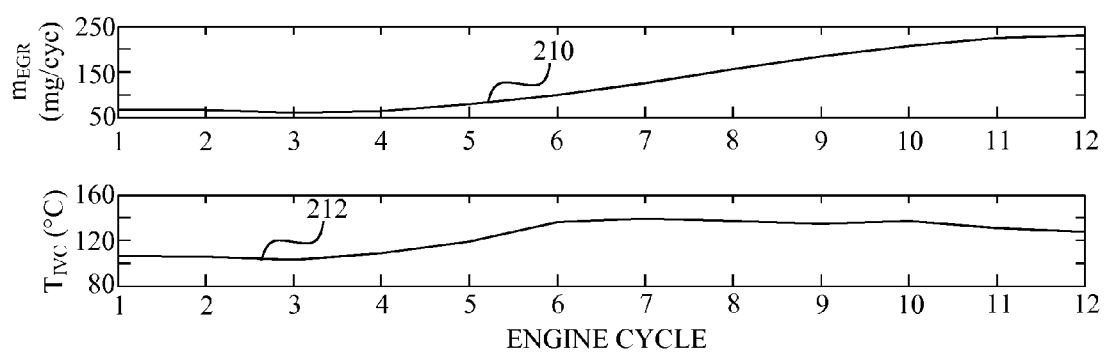
FIG. 11 depicts the mass of the EGR and the temperature of the EGR at intake valve closing during the transition from SI mode to HCCI mode.

As the valve profile is modified, the amount of trapped residuals increases. The valve ramping of FIG. 10 thus allows a smooth transition in the amount of trapped residuals, intake pressure, and mixture temperature, leading to a smooth and robust transition towards compression ignition. These increases are depicted in FIG. 11. In FIG. 11, the mass of the trapped residuals is indicated by the line 210 while the temperature of the gases is indicated by the line 212.

Figure 12:
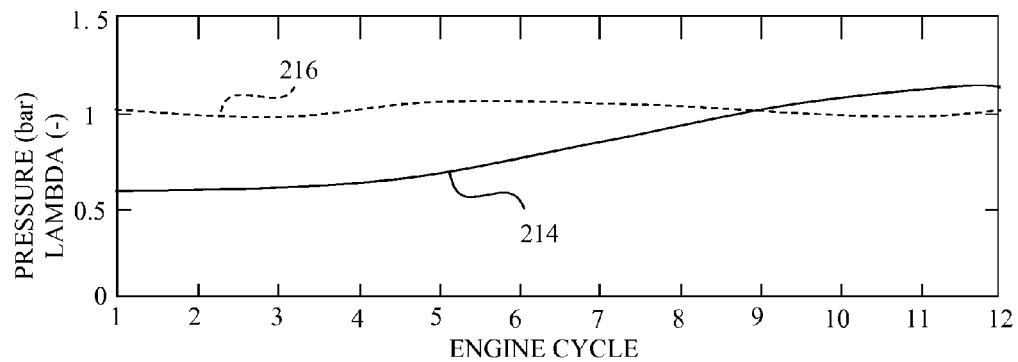
FIG. 12 depicts the lambda that is maintained and the pressure at the intake valve during the transition from SI mode to HCCI mode.

Because the mass of gas in the cylinder 104 is increasing, particularly between cycles 4 and 10 in FIG. 11, by constant fuel mass, the intake manifold pressure has to be increased in order to maintain the same inducted air mass. This increase is depicted in FIG. 12 where line 214 is the pressure at the intake valve 106 and the line 216 is Lambda. The incorporation of a short valve duration and lift in multi-cylinder embodiments results in the decoupling of cross-talking between cylinders during gas exchange, especially during the exhaust process. The amount of trapped residual gases thus becomes independent of cylinder firing order, and the combustion mode used in each cylinder. Consequently, the amount of trapped exhaust gas is only a function of exhaust valve closing timing.

Consequently, the process controlled by the processor 116 controls the valve profile between SI and HCCI mode in terms of valve lift and duration to minimize the problem of gas exchange dynamics during a combustion mode switch. Initially, a switch is accomplished from high valve lift normally used in SI mode to low valve lift while using an SI combustion strategy. In term of combustion control, this has is done easily since activation of the spark plug controls the combustion phasing. Thus, precise knowledge of the gas exchange dynamics is not needed.

The reduced valve lift and reduced gas exchange reduces the efficiency of combustion within the cylinder, which leads to higher fuel consumption without an ensuing modification of the engine output, and therefore requires opening of the throttle 112. Accordingly, stoichiometry is maintained both while opening the throttle 112 to a position needed for eventual HCCI operation, and while increasing the rate of internal EGR in region 152 of operating parameters line 150 in FIG. 6 through controlling the valves 106/108 to set points needed for HCCI mode. The throttle 112 is thus used to control the output of the engine 102 during transition.

Once the EGR has risen to the region 154 of operating parameters line 150 of FIG. 6, there is sufficient EGR to enable auto-ignition. The processor 116 thus initiates the mode switch to HCCI, and the spark plug 110 is deactivated. In HCCI mode, the fuel provided to the cylinder 104 can be reduced because of the increased efficiency of the HCCI mode.

Consequently, by incorporating the low valve lift SI modes 138/144, smooth transitions between the two combustion modes are enabled by decoupling the valve-switching dynamics from the combustion mode switching dynamics. This decoupling simplifies the control problem by relegating the valve lift profile switch to happen during pure SI combustion.

Figure 13:
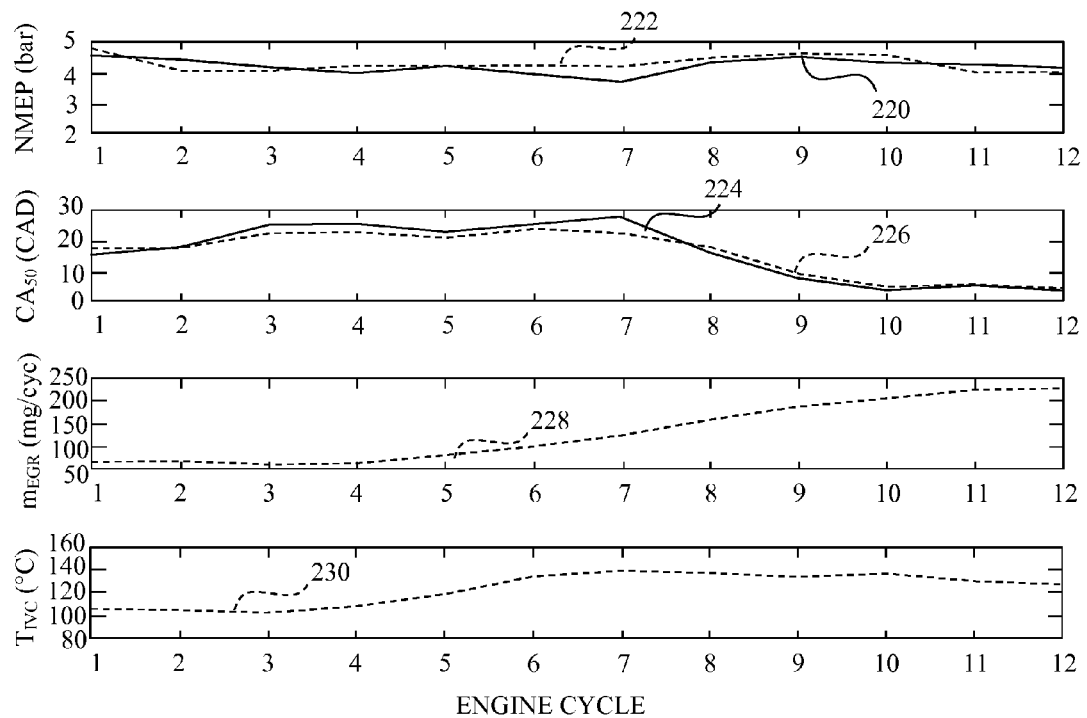
FIG. 13 depicts the work output, $CA_{50}$, mass of the EGR and the temperature of the EGR at intake valve closing during a transition from SI mode to HCCI mode.

The above described process was demonstrated on a single cylinder engine, at 2000 rpm, for a load of 4 (NMEP). The results are presented in FIG. 13 wherein the engine 102 was initially controlled in SI mode and then transitioned to HCCI mode at cycle 7. FIG. 13 includes a line 220 showing the work output, which is expressed as net mean effective pressure (NMEP) of the demonstration engine along with a line 222 showing the work output of a model of the demonstration engine. The lines 220 and 222 show a good correlation between experimental results and modelling of the system 100. The line 220 indicates that throughout the switch from SI mode to HCCI mode, the output of the system 100 was relatively constant.

FIG. 13 further includes a line 224 showing "$CA_{50}$" of the demonstration engine, which is defined as the crankshaft angle at which 50% of the energy from combustion has been released, along with a line 226 showing the $CA_{50}$ of the model of the system. The line 224 reflects a delay in the combustion timing which begins at cycle 2, resulting in a later $CA_{50}$. The delayed $CA_{50}$ continues until HCCI mode initiation, and which point the $CA_{50}$ is driven rapidly toward zero. The lines 224 and 226 show a good correlation between experimental results and modelling of the system.

Line 228 in FIG. 13 depicts the modeled amount of residual gas while line 230 depicts the modeled temperature of the gasses in the cylinder when the intake valve closes. The lines 228 and 230 indicate that as the valve open/close profile of the system is ramped from the SI mode with low lift to the HCCI mode with low lift, the amount of gas in the cylinder 104, and the temperature of that gas, increases.

FIG. 13 thus indicates that combustion phasing is smoothly advanced into HCCI mode, without early phasing or misfire. Additionally, the engine load remains relatively constant during the switch.

While the discussion above has focused upon embodiments which transition directly from SI mode to HCCI mode, the strategy described above can further be applied to transitions wherein the processor 116 executes the program instructions in the memory 114 provide spark assisted compression ignition (SACI). By incorporating a few cycles of SACI between the SI mode and the HCCI mode, the robustness of the system, which is strongly dependent upon load, speed, and environmental conditions, is increased.

Figure 14:
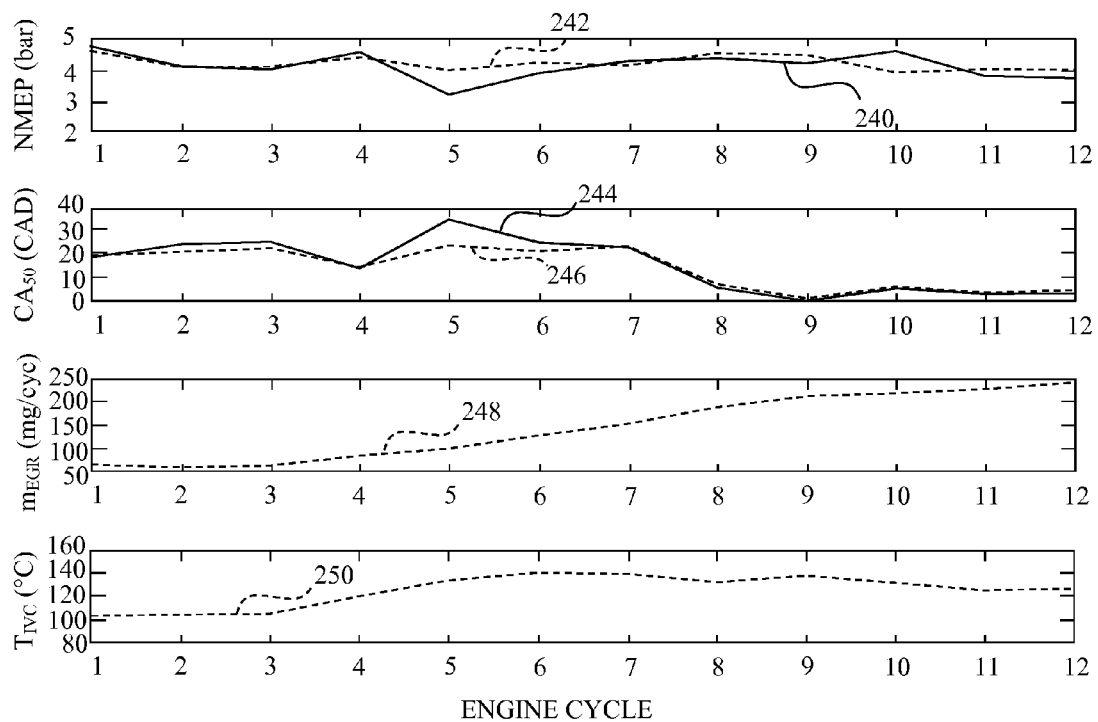
FIG. 14 depicts the work output, $CA_{50}$, mass of the EGR and the temperature of the EGR at intake valve closing during a transition from SI mode to spark assisted compression ignition (SACI) mode to HCCI mode.

FIG. 14 depicts the results of including SACI in a transition from SI mode to HCCI mode on the single cylinder engine, at 2000 rpm, for a load of 4 (NMEP). In FIG. 14, the demonstration engine was initially controlled in SI mode and then transitioned to SACI mode at cycle 6. At cycle 9, a transition to HCCI mode was effected.

FIG. 14 includes a line 240 showing the work output of the demonstration engine along with a line 242 showing the work output of the model of the system. The lines 240 and 242 show a good correlation between experimental results and modelling of the system. The line 240 indicates that throughout the switch from SI mode to SACI mode to HCCI mode, the output of the system was relatively constant.

FIG. 14 further includes a line 244 showing the $CA_{50}$ of the demonstration engine, along with a line 246 showing the $CA_{50}$ of the model of the system. The line 244 reflects a delay in the combustion timing which ramps up after cycle 4, resulting in a later $CA_{50}$. Unlike the drive toward zero that is exhibited in HCCI mode in FIG. 13 (see line 224), the SACI mode begins the drive toward zero. Thus, the $CA_{50}$ is relatively stable immediately upon entry into HCCI mode. The lines 244 and 246 show a good correlation between experimental results and modelling of the system.

Figure 15:
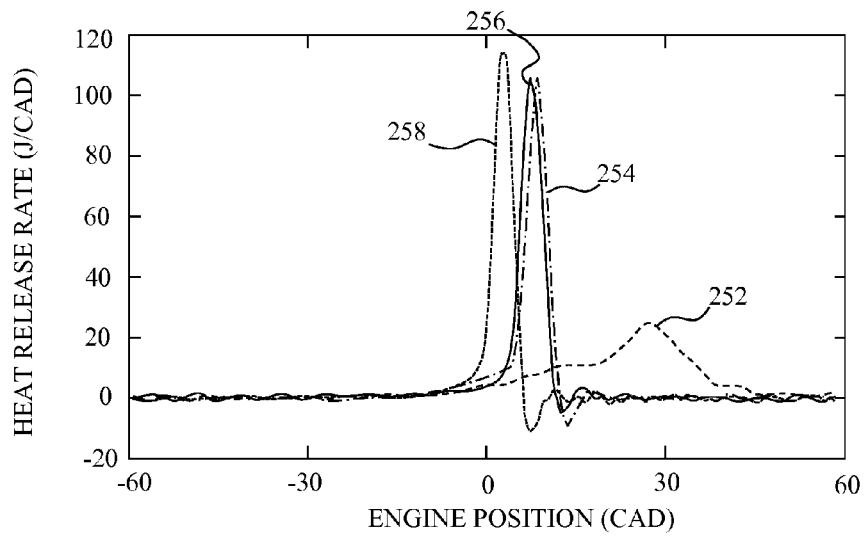
FIG. 15 depicts a plot showing heat released from a cylinder during the last SI cycle and three SACI cycles during the transition from SI mode to SACI mode to HCCI mode.

Line 248 in FIG. 14 depicts the modeled amount of residual gas while line 250 depicts the modeled temperature of the gasses in the cylinder when the intake valve closes. The lines 248 and 250 indicate that as the valve open/close profile of the system is ramped from the SI mode with low lift to the HCCI mode with low lift, the amount of gas in the cylinder 104, and the temperature of that gas, increases. The heat release profile is depicted in FIG. 15 where line 252 depicts the last SI combustion cycle (cycle 6), line 254 depicts the first SACI cycle (cycle 7), line 256 depicts the second SACI cycle (cycle 8), and line 258 depicts the third SACI cycle (cycle 9). FIG. 15 shows that the SACI cycles are a mixed combustion regime consisting of premixed combustion and compression ignition.

Consequently, the mixed combustion regime (SACI) can be achieved with a high level of dilution, and early spark timing. This approach gradually increases the amount of residuals, and gradually increases the mixture temperature. Consequently, a gradual increase in the proportion of compression ignition in the heat release is achieved, until pure HCCI combustion results.

The above described processes facilitate the transition from SI to HCCI. In some embodiments, the process terminates upon transition from SI mode to SACI mode, and the system does not include HCCI mode.

While the invention has been illustrated and described in detail in the drawings and foregoing description, the same should be considered as illustrative and not restrictive in character. Only the preferred embodiments have been presented and all changes, modifications and further applications that come within the spirit of the invention are desired to be protected.

The invention claimed is:

1. An engine system comprising:
   a cylinder;
   an inlet valve configured to control the flow of gases into the cylinder;
   an outlet valve configured to control the flow of gases out of the cylinder;
   a throttle configured to control the flow of fuel into the cylinder;
   a memory including program instructions stored therein; and
   a processor operably connected to the inlet valve, the outlet valve, the throttle, and the memory, and configured to execute the program instructions to
   control the inlet valve and the outlet valve in accordance with a homogeneous charge compression ignition (HCCI) valve lift profile and a spark ignition (SI) valve open/close profile, the SI valve open/close profile associated with a throttled SI mode, and activate a first spark in the cylinder while controlling the inlet valve and the outlet valve in accordance with the HCCI valve lift profile and the SI valve open/close profile.

2. The system of claim 1, wherein the processor is further configured to execute the program instructions to:

control the inlet valve and the outlet valve from an SI valve timing profile to an HCCI valve timing profile after controlling the inlet valve and the outlet valve in accordance with the HCCI valve lift profile.

3. The system of claim 2, wherein the processor is further configured to execute the program instructions to:

control the throttle from a throttled position toward an unthrottled position as the inlet valve and the outlet valve are controlled from the SI valve timing profile to the HCCI valve timing profile.

4. The system of claim 3, wherein the processor is further configured to execute the program instructions to:

maintain a constant stoichiometry as the inlet valve and the outlet valve are controlled from the SI valve timing profile to the HCCI valve timing profile.

5. The system of claim 3, wherein the processor is further configured to execute the program instructions to:

delay activation of the first spark from a crankshaft angle degree (CAD) at which a second spark was activated when the inlet valve and the outlet valve were controlled in accordance with the SI valve timing profile and an SI valve lift profile.

6. The system of claim 5, wherein the processor is further configured to execute the program instructions to:

delay an end of fuel injection (EOI) during a first HCCI cycle following controlling the inlet valve and the outlet valve to the HCCI valve timing profile beyond a CAD associated with an EOI during a normal HCCI cycle.

7. The system of claim 6, wherein the processor is further configured to execute the program instructions to:

delay an EOI during a second HCCI cycle following the first HCCI cycle beyond the CAD associated with the EOI during the normal HCCI cycle.

8. The system of claim 7, wherein the processor is further configured to execute the program instructions to:

delay an EOI during a third HCCI cycle following the second HCCI cycle beyond the CAD associated with the EOI during the normal HCCI cycle.

9. The system of claim 6, wherein the processor is further configured to execute the program instructions to:

activate a second spark in the cylinder prior to the first HCCI cycle and after an amount of residual gases remaining in the cylinder is sufficient to support auto-ignition.

10. The system of claim 9, wherein the processor is further configured to execute the program instructions to:

activate a third spark in the cylinder prior to the first HCCI cycle and after activating the second spark.

11. A method of controlling an engine system with a cylinder, an inlet valve configured to control the flow of gases into the cylinder, and an outlet valve configured to control the flow of gases out of the cylinder, comprising:

controlling the inlet valve and the outlet valve in accordance with a homogeneous charge compression ignition (HCCI) valve lift profile and a spark ignition (SI) valve open/close profile, the SI valve open/close profile associated with a throttled SI mode; and activating a first spark in the cylinder while controlling the inlet valve and the outlet valve in accordance with the HCCI valve lift profile and the SI valve open/close profile.

12. The method of claim 11, further comprising:

controlling the inlet valve and the outlet valve from an SI valve timing profile to an HCCI valve timing profile after controlling the inlet valve and the outlet valve in accordance with the HCCI valve lift profile.

13. The method of claim 12, further comprising:

controlling the throttle from a throttled position toward an unthrottled position as the inlet valve and the outlet valve are controlled from the SI valve timing profile to the HCCI valve timing profile.

14. The method of claim 13, further comprising:

maintaining a constant stoichiometry as the inlet valve and the outlet valve are controlled from the SI valve timing profile to the HCCI valve timing profile.

15. The method of claim 13, further comprising:

delaying activation of the first spark from a crankshaft angle degree (CAD) at which a second spark was activated when the inlet valve and the outlet valve were controlled in accordance with the SI valve timing profile and an SI valve lift profile.

16. The method of claim 15, further comprising:

delaying an end of fuel injection (EOI) during a first HCCI cycle following controlling the inlet valve and the outlet valve to the HCCI valve timing profile beyond a CAD associated with an EOI during a normal HCCI cycle.

17. The system of claim 16, further comprising:

delaying an EOI during a second HCCI cycle following the first HCCI cycle beyond the CAD associated with the EOI during the normal HCCI cycle.

18. The system of claim 17, further comprising:

delaying an EOI during a third HCCI cycle following the second HCCI cycle beyond the CAD associated with the EOI during the normal HCCI cycle.

19. The method of claim 16, further comprising:

activating a second spark in the cylinder prior to the first HCCI cycle and after an amount of residual gases remaining in the cylinder is sufficient to support auto-ignition.

20. The method of claim 19, further comprising:

activating a third spark in the cylinder prior to the first HCCI cycle and after activating the second spark.

* * * * *